Aug. 30, 1955

C. S. GRIMSHAW 2,716,345

GYROSCOPE PRECESSING MEANS

Filed Aug. 4, 1952

INVENTOR.
CHARLES S. GRIMSHAW
BY
*Schmitt*
*Walter S. Paul*
ATTORNEYS

United States Patent Office 2,716,345
Patented Aug. 30, 1955

2,716,345

GYROSCOPE PRECESSING MEANS

Charles S. Grimshaw, Erie, Pa., assignor, by mesne assignments, to the United States of America as represented by the Secretary of the Navy Application August 4, 1952, Serial No. 302,493

3 Claims. (Cl. 74—5.46)

The present invention relates to a gyroscope precessing means and more particularly to an arrangement in a gyroscope assembly of two precessing coils, one mounted on the gimbal and one mounted on the rotor frame in a manner which results in improved efficiency of the gyroscope assembly.

In previously known arrangements for precessing coils some were characterized by necessarily wide air gaps which resulted in low flux in the air gap especially when the size of the magnet was limited by the size of the gyroscope. Other arrangements were handicapped by the fact that the coils were set near the axes of the gyroscope so that their effective radii were small.

The instant invention provides two precessing coils, one mounted at one end of the rotor supporting frame, and one mounted upon a projection from one side of the gimbal. Both of these coils are mounted at a substantial distance from the axes so that each has a large effective radius and each coil is so disposed between a pair of magnets supported by the gyroscope housing, that the air gap between the magnets need not be larger than the thickness of the coil plus the minimum necessary clearance. Thus, the device disclosed herein avoids the disadvantages inherent in the prior art.

An object of the present invention is to provide a more efficient design for a gyroscope assembly.

Another object is the provision of a more effective precessing coil arrangement for gyroscopes.

With these and other objects in view, as will hereinafter more fully appear, and which will be more particularly pointed out in the appended claims, reference is now made to the following description taken in connection with the accompanying drawings, wherein:

Figure 1:
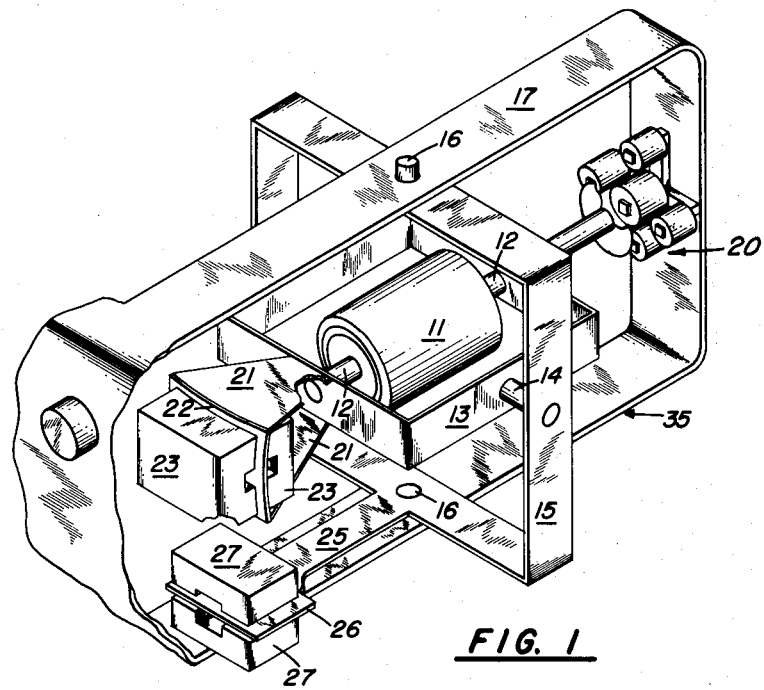
Fig. 1 shows a schematic perspective representation of the invention.

Referring now to the drawings, wherein like reference characters designate like or corresponding parts throughout the several views, there is shown a gyroscope assembly 35 in which a rotor 11 is supported on a shaft 12 rotatably mounted in frame 13, which is rotatably mounted on shafts 14 in gimbal 15. Said gimbal is in turn mounted on pivots 16 in housing 17. The supporting members 21 extending longitudinally of the gyroscope from one end of frame 13 support a precessing coil 22 disposed between magnets 23 fixedly mounted upon the housing 17 by any suitable means (shown schematically in Figs. 2 and 4), the supporting arm 25 extending longitudinally of the gyroscope from one side of the gimbal 15 supports a second precessing coil 26 disposed between magnets 27 fixedly mounted upon the housing 17 by any suitable means (shown schematically in Figs. 2 and 4). Sensing means 20 of any suitable type, e. g., reluctance, are provided opposite an end of shaft 12.

Figure 2:
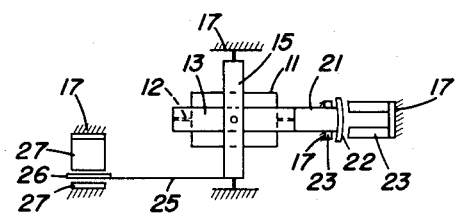
Fig. 2 is a schematic side elevation of a simplified representation of the apparatus in Fig. 1.
Figure 3:
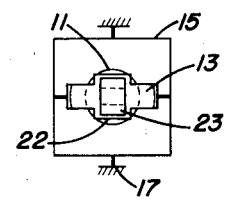
Fig. 3 is an end view of the schematic showing in Fig. 2.
Figure 4:
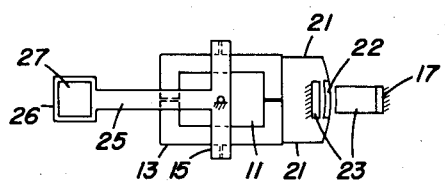
Fig. 4 is a bottom plan view of the schematic showing in Fig. 2.

Figures 2, 3 and 4 show simplified representations of the relationship of the precessing coils 22 and 26, mounted on the frame 13 and the gimbal 15, respectively, to the magnets 23 and 27, respectively, all supported by the housing 17.

In operation the precessing coils described above, function in the usual manner. However, the special manner of constructing and arranging these coils as described above provides the following advantages. These coils are located at relatively large distances from the axes of rotation so that they have large effective radii. In addition, they are so arranged that they move in a substantially planar path, so that the air gap between the magnets need only to be wide enough to provide the minimum necessary clearance for the coil.

Obviously many modifications and variations of the present invention are possible in the light of the above teachings. It is therefore to be understood that within the scope of the appended claims the invention may be practiced otherwise than as specifically described.

Having thus described the invention, what is claimed is:

1. In a gyroscope assembly having a rotor rotatably mounted in a frame which is in turn pivotally mounted in a gimbal pivotally mounted in a housing, all arranged to be rotatable about mutually perpendicular axes, a supporting member extending longitudinally of the gyroscope assembly from one end of the frame, a first precessing coil mounted upon one end of said supporting member, a first pair of spaced magnets fixedly mounted upon the housing and disposed on opposite sides of said first coil, an elongated supporting arm extending longitudinally of the gyroscope assembly from one side of the gimbal, a second precessing coil mounted upon the free end of said supporting arm, and a second pair of spaced magnets fixedly mounted upon the housing and disposed on opposite sides of said second coil.

2. In a gyroscope assembly, a rotor secured to a shaft, a frame in which said rotor is rotatably mounted by means of said shaft, a gimbal in which said frame is pivotally mounted for movement about an axis perpendicular to the axis of rotation of said rotor, a housing in which said gimbal is pivotally mounted for movement about an axis perpendicular to the axes of rotation of the rotor and the frame, a first supporting means extending from one end of said frame adjacent to said shaft, a first precessing coil mounted upon said first supporting means and disposed perpendicular to the axis of rotation of said rotor, a first magnet fixedly mounted upon said housing and disposed adjacent to said first coil, a second supporting means extending from one side of said gimbal adjacent to its axis of rotation, a second precessing coil mounted upon said second supporting means and disposed parallel to the plane of the axis of rotation of said rotor and said frame, and a second magnet fixedly mounted upon said housing and disposed adjacent to said second coil.

3. In a gyroscope assembly, a rotor secured to a shaft, a frame in which said rotor is rotatably mounted by means of said shaft, a first pair of pivotal mounting means, a gimbal in which said frame is pivotally mounted on said first pair of mounting means for movement about an axis perpendicular to the axis of rotation of said rotor, a second pair of pivotal mounting means, a housing in which said gimbal is pivotally mounted on said second pair of mounting means for movement about an axis perpendicular to the axes of rotation of the rotor and the frame, a first elongated supporting means extending from one end of said frame adjacent to one end of said shaft, a first precessing coil mounted upon said first supporting means and disposed perpendicular to the axis of rotation of said rotor, a first pair of spaced magnets fixedly mounted upon said housing and disposed on opposite sides of said first coil, a second elongated supporting means extending from one side of said gimbal adjacent to one of second pair of mounting means, a second precessing coil mounted upon said second supporting means and disposed parallel to the plane of the axes of rotation of said rotor and said frame, and a second pair of spaced magnets fixedly mounted upon said housing and disposed on opposite sides of said second coil.

References Cited in the file of this patent

UNITED STATES PATENTS

| | | |
|---|---|---|
| 2,175,631 | Koster | Oct. 10, 1939 |
| 2,188,606 | Koster | Jan. 30, 1940 |
| 2,412,204 | Carter et al. | Dec. 10, 1946 |
| 2,598,672 | Braddon et al. | June 3, 1952 |

FOREIGN PATENTS

| | | |
|---|---|---|
| 640,632 | Canada | July 26, 1950 |